United States Patent
Brunhuber et al.

(10) Patent No.: US 9,341,114 B2
(45) Date of Patent: May 17, 2016

(54) GAS POWER PLANT

(71) Applicant: Siemens Aktiengesellschaft, Munich (DE)

(72) Inventors: Christian Brunhuber, Auerbach (DE); Oliver Hirschfelder, Nuremberg (DE); Uwe Lenk, Zwickau (DE); Wolfgang Menapace, Erlangen (DE); Nicolas Vortmeyer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/379,439

(22) PCT Filed: Feb. 1, 2013

(86) PCT No.: PCT/EP2013/052018
§ 371 (c)(1),
(2) Date: Aug. 18, 2014

(87) PCT Pub. No.: WO2013/124135
PCT Pub. Date: Aug. 29, 2013

(65) Prior Publication Data
US 2015/0035277 A1 Feb. 5, 2015

(30) Foreign Application Priority Data
Feb. 20, 2012 (DE) .......................... 10 2012 202 575

(51) Int. Cl.
*F02C 6/14* (2006.01)
*F02C 6/18* (2006.01)
(Continued)

(52) U.S. Cl.
CPC ... *F02C 6/18* (2013.01); *F02C 6/00* (2013.01); *F02C 6/04* (2013.01); *F02C 6/14* (2013.01); *H02K 7/1823* (2013.01); *Y02E 20/14* (2013.01)

(58) Field of Classification Search
CPC ............... F02C 6/18; F02C 6/00; F02C 6/04; F02C 6/14; H02K 7/1823; Y02E 20/14
USPC .......................... 60/39.19, 39.182, 39.5, 727
See application file for complete search history.

(56) References Cited

U.S. PATENT DOCUMENTS 3,877,218 A   4/1975 Nebgen
4,347,706 A * 9/1982 Drost .............................. 60/659
(Continued)

FOREIGN PATENT DOCUMENTS

CA   2086184 A1   7/1993
DE   19613802 A1  10/1997
(Continued)

OTHER PUBLICATIONS

Stationäre Gasturbinen; Chr. Lechner, J. Seume: Stationäre Gasturbinen. 2. Auflage. Berlin : Springer Verlag, 2010. S. 73,152 bis 154,190,191,193,194,491.—ISBN 978-3-540-92788-4. [Fachbuch]; 2010.

*Primary Examiner* — Ted Kim
(74) *Attorney, Agent, or Firm* — Beusse Wolter Sanks & Maire

(57) ABSTRACT

A method for operating a gas power plant is provided, having a gas turbine which has a compressor stage and a turbine stage, and is connected to a generator via an axle, wherein the generator is designed to also be operated as a motor, wherein the method involves the operation of the generator as a motor for the rotatory operation of the axle, as well as a simultaneous discharge of the heated gas flow exiting from the turbine stage and routing of said gas flow to a first heat exchanger for the transfer of thermal energy from the gas flow to a heat exchanger fluid, wherein the heat exchanger fluid is provided to either discharge thermal energy to a heat accumulating medium or it can be used an accumulating medium itself for temporary storage.

19 Claims, 2 Drawing Sheets

(51) Int. Cl.
*F02C 6/04* (2006.01)
*F02C 6/00* (2006.01)
*H02K 7/18* (2006.01)

(56) References Cited

U.S. PATENT DOCUMENTS

| | | | |
|---|---|---|---|
| 4,507,269 A | | 3/1985 | Degregoria |
| 4,720,968 A | * | 1/1988 | Knizia ................ 60/39.511 |
| 5,114,167 A | | 5/1992 | Shieh |
| 5,343,693 A | * | 9/1994 | Komatsu ............ F23R 3/26 60/39.23 |
| 5,349,812 A | * | 9/1994 | Taniguchi .......... F23R 3/26 60/39.23 |
| 5,386,687 A | | 2/1995 | Frutschi |
| 5,391,925 A | * | 2/1995 | Casten et al. ............ 290/1 R |
| 6,047,549 A | * | 4/2000 | Saurer et al. ........... 60/39.182 |
| 6,050,083 A | * | 4/2000 | Meckler ................ 60/39.182 |
| 7,032,373 B2 | * | 4/2006 | Franke et al. ......... 60/39.182 |
| 7,500,349 B2 | * | 3/2009 | Althaus ................ 60/39.511 |
| 7,966,829 B2 | * | 6/2011 | Finkenrath et al. ...... 60/39.182 |
| 8,640,465 B2 | * | 2/2014 | Corbett ..................... 60/775 |
| 2008/0000233 A1 | * | 1/2008 | Althaus et al. .............. 60/659 |
| 2008/0148734 A1 | | 6/2008 | Althaus |
| 2012/0067057 A1 | * | 3/2012 | Hofmann et al. ......... 60/39.19 |

FOREIGN PATENT DOCUMENTS

| | | | |
|---|---|---|---|
| EP | 0549930 A1 | | 7/1993 |
| EP | 2256316 | * | 12/2010 |
| JP | S53140440 A | | 12/1978 |
| JP | S59138730 A | | 8/1984 |
| JP | H05248262 A | | 9/1993 |
| JP | H0610706 A | | 1/1994 |
| JP | H11343864 A | | 12/1999 |
| JP | 2001115859 | | 4/2001 |
| JP | 2003074375 A | | 3/2003 |
| WO | 2011053411 A1 | | 5/2011 |

* cited by examiner

| Operating the generator as a motor |
| Simultaneous diverting of the gas flow which discharges from the turbine stage |
| Feeding this gas flow to a first heat exchanger for transferring thermal energy from the gas flow to a heat exchanger fluid |
| Storing the heat exchanger fluid in a thermal store |

GAS POWER PLANT

CROSS REFERENCE TO RELATED APPLICATIONS

This application is the US National Stage of International Application No. PCT/EP2013/052018 filed Feb. 1, 2013, and claims the benefit thereof. The International Application claims the benefit of German Application No. DE 102012202575.8 filed Feb. 20, 2012. All of the applications are incorporated by reference herein in their entirety.

FIELD OF INVENTION

The present invention relates to a method for operating a gas power plant, comprising a gas turbine which is connected to a generator via a shaft, wherein the generator is designed to be also operated as a motor. Furthermore, the invention relates to such a gas power plant.

BACKGROUND OF INVENTION

On account of the increasingly occurring shifts in the public electricity supply network towards a supply with renewable power generation sources which are arranged on a decentralized basis, an improved regulation or suitable temporary storage of electric energy is increasingly necessary in order to also be able to operate the electricity supply networks in a stable manner in the case of sharply fluctuating demands or power supplies.

In particular, the temporary storage of electric energy in the form of mechanical energy, for example by means of pressure or a change of the potential energy of a storage medium, is especially suitable for short-term or medium-term energy storage. In this case, the quantities of surplus electric energy which are available in the public electricity supply network are typically used for altering the storage medium with regard to its mechanical energy state. In the case of pump storage power plants, water, for example, is raised to a higher potential energy level by means of suitable pumping devices in order to drive turbines and generators for power generation in a time-staggered manner by means of the water falling to its original level. The current can be fed again into the public electricity supply network and above all can be made available for times at which there is an increased demand for power or regulation.

A disadvantage of the conventional storage power plant technologies, however, is their local limitation with regard to their possible application. Therefore, pump storage power plants in most cases can only be used where the local topography features suitable height differences, for instance. In addition to these disadvantages, an undesirable invasion into the appearance of the landscape and into nature is also frequently cause for complaint. Above all, as a result of the necessary erection of large constructional devices above ground such disadvantages can hardly be avoided.

SUMMARY OF INVENTION

On account of these disadvantages of the conventional technologies for temporary storage of electric energy, it proves to be necessary to offer an improved technical solution. In particular, it is to be an object of the present invention to propose a method which achieves the transfer of electric power from the public supply network into a suitable form of storable energy by means of already existing power plant technology. Furthermore, it proves to be particularly desirable to propose a method which, based on already existing power plant technologies, makes it possible for power plants to be able to be converted by means of only small and low-cost modifications to the extent that as a result they are suitable not only for the generation of electric power but also for providing suitable forms of storable energies. Also to be proposed is especially a method for the provision of storable energy which allows comparatively smaller invasions into nature and the environment, or completely avoids this.

According to aspects of the invention, this object is achieved by a method and a power plant according to the patent claims.

In particular, this object is achieved by a method for operating a gas power plant comprising a gas turbine, which has a compressor stage and a turbine stage, and is connected to a generator via a shaft, wherein the generator is designed to be also operated as a motor, which method comprises the following steps: —operating the generator as a motor for the rotational operation of the shaft; —simultaneous diverting of the gas flow which discharges from the turbine stage and —feeding this gas flow to a first heat exchanger for transferring thermal energy from the gas flow to a heat exchanger fluid; —feeding the heat exchanger fluid to a thermal store.

Furthermore, this object is achieved by a method for operating a gas power plant comprising a gas turbine, which has a compressor stage and a turbine stage, and is connected to a generator via a shaft, wherein the generator is designed to be also operated as a motor, which method comprises the following steps: —operating the generator as a motor for the rotational operation of the shaft; —simultaneous diverting of the gas flow which discharges from the turbine stage and —feeding this gas flow to a first heat exchanger for transferring thermal energy from the gas flow to a heat exchanger fluid; —transferring thermal energy of the heat exchanger fluid to a thermal storage fluid, which thermal storage fluid is fed to a thermal store in a further step.

Furthermore, this object is achieved by a gas power plant comprising a gas turbine, which has a compressor stage and a turbine stage, and is connected to a generator via a shaft, wherein the generator is designed to be also operated as a motor, furthermore comprising a gas routing device which interacts with the turbine stage in such a way that a gas flow, which discharges from the turbine stage, is diverted and fed to a first heat exchanger, wherein the heat exchanger is designed to extract thermal energy from the gas flow and to transfer it to a heat exchanger fluid which can be introduced in a thermal store for temporary storage.

In addition, this object is achieved by a gas power plant comprising a gas turbine, which has a compressor stage and a turbine stage, and is connected to a generator via a shaft, wherein the generator is designed to be also operated as a motor, furthermore comprising a gas routing device which interacts with the turbine stage in such a way that a gas flow, which discharges from the turbine stage, is diverted and fed to a first heat exchanger, wherein the heat exchanger is designed to extract thermal energy from the gas flow and to transfer it to a heat exchanger fluid which in a second heat exchanger can release at least some of the thermal energy to a heat storage fluid which can be introduced in a thermal store for temporary storage.

According to aspects of the invention, the conversion of electric energy into thermal energy is therefore carried out. This conversion can be achieved by means of gas power plant technology which already exists at a large number of sites specifically by the generator, which is provided for electric power generation, being adapted to the extent that it can also be operated as a motor for generating a thermally heated gas flow.

Since the generator is based purely on the reverse of a technical principle with regard to a motor, only comparatively small and inexpensive modifications are to be undertaken for adapting the generator, which modifications allow the generator to also be operated as a motor. In this case, the protection concept of the generator is to be revised, for example. Moreover, generators for gas turbines are often already constructed so that they can be operated as a motor during the start-up phase until achieving a desired minimum rotational speed. Such an operation as a motor, however, ensures only an asynchronous operation which is not intended to provide high power inputs either for achieving the nominal rotational speed of the gas turbine. The provision of a thermally heated gas flow is hardly possible by means of the motor in the case of conventional power inputs without additional heating since during a conventional operation of the gas turbine an ignition of fuel in the combustion chamber stage before achieving the nominal rotational speed additionally provides combustion output, that is to say ensures that a desired compressor mass flow can be achieved. The motor therefore does not have to provide the total output during this normal operation in order to bring the gas turbine up to nominal rotational speed. If, however, the combustion output is not made available, or not made available to the degree as in the case of conventional operation, this requires an additional power input by means of the motor, for which conventional generators, which are operated as motors, are not designed.

During operation of the generator as a motor, the use of electric energy, which can be drawn from the public electricity supply network, is carried out for the rotational operation of the shaft. This in turn drives the turbine stage and compressor stage which are covered by the gas turbine and therefore ensure a gas flow through the gas turbine which corresponds to the flow during a power generating operation of the gas turbine. Differing from in the case of power generating operation of the gas turbine, however, no power generation is to be carried out in the case of the operation according to the invention, but only the conversion of electric energy into a suitable, storable form of energy. Power is therefore consumed. Moreover, the power consumption, on account of the large inertia of shaft, compressor and turbine of the gas turbine, acts in a frequency stabilizing manner upon the network frequency of the public supply network.

In this respect, lower network fluctuations can also be compensated in a suitable manner while electric energy is being drawn from the public electricity supply network at the same time.

During operation, according to aspects of the invention, of the generator for generating thermal energy by means of the gas turbine, air is first of all drawn into the compressor stage from the environment in order to compress this air and therefore to achieve at least partially an adiabatic heating of this thereby compressed air. Consequently, during operation, according to the invention, of the generator as a motor relatively hotter air discharges from the compressor stage and passes through the combustion chamber stage and also the turbine stage. Discharging from the turbine stage, the gas can be diverted in a suitable manner, wherein its thermal energy, after suitable guiding, can be transferred to a heat exchanger fluid by means of thermal interaction in a first heat exchanger. This heat exchanger fluid can be stored in a thermal store for further use at a later time, such as for re-conversion in the event of higher power demands in the public electricity supply network. Alternatively, the gas power plant can also be designed so that the heat exchanger fluid can transfer its thermal energy in a second heat exchanger to a thermal store fluid which is then also stored in a thermal store. In this way, the thermal energy of the heat exchanger fluid and/or of the thermal store fluid are, or is, also available for further thermal applications at a later point in time. Such applications are especially advantageously carried out at times at which power from the public electricity supply networks is relatively expensive.

In this case, reference is made to the fact that the thermal store is a component which is not covered by an already existing steam generator unit which is provided for steam generation for the operation of a steam turbine. The thermal store is rather an additional component which is not covered by a conventional gas and steam power plant.

Reference is also made to the fact that the discharging of the heated air is carried out from the turbine stage and there is no requirement for constructional modifications to the gas turbine itself. In particular, there is to be no provision for additional outlets via which the air, heated by compression, would have to be tapped off.

In the present case, the term gas power plant is to be understood in a broad sense. In particular, a combined gas and steam power plant, in which a steam turbine is driven by means of the thermal waste heat of the flue gas of a gas turbine, is also to be understood by a gas power plant. Moreover, a gas power plant which supplies an external steam power plant with thermal heat is also covered by this. Similarly, a large-scale process-engineering application, which has a gas turbine for power generation, is to be understood by a gas power plant.

According to another embodiment of the method for operating a gas power plant, this can provide that the generator is operated as a motor by means of surplus power. Since surplus power can sometimes be drawn from the public electricity network at no cost or even with financial gain, the operation of the generator as a motor can be carried out very inexpensively. Since, moreover, the gas turbine is typically not used for power generation at times at which surplus power is available in the public electricity network, the operation, according to the embodiment, of the generator as a motor is suitable from the economical point of view in particular.

According to a further embodiment of the method, the generator is operated as a motor at variable rotational speed. Such an operation allows different quantities of electric energy to be drawn from the electricity supply network and can therefore be adapted in a suitable manner to the quantity of available surplus power. Moreover, a variable operation also allows the provision of a gas flow of different temperatures as a result of different compression outputs. According to corresponding temperature selection, the gas flow can subsequently be adapted with regard to its heat content to the requirements of the application.

According to a further embodiment of the method, the generator can be operated as a motor in such a way that the gas flow has at least a temperature of 100° C., preferably of at least 150° C. and most especially preferably of at least 300° C. In this case, the motor output or the rotational speed is to be adapted to correspond to the temperature of the gas flow. Since in the case of a higher compressor mass flow, and therefore higher compressor exit pressure, an enhanced compression rate of the motor also results, higher quantities of heat at higher temperatures can sometimes be transferred to the gas flow in the event of such operating conditions. This advantageously makes itself particularly advantageously felt in the case of temperature-controlled methods for producing thermal energy, or temperature-controlled steps of such methods. If during compression without additional firing in the gas turbine a temperature level of between 120° C. and 200° C. is to be expected, then with suitable additional firing a higher temperature level of more than 200° C., especially even of more than 300° C., can also be achieved.

According to a further embodiment of the method, it is provided that during the operation of the generator as a motor for releasing thermal energy by means of the gas flow no fuel is fed to the gas turbine. The transfer of thermal energy to the gas flow in the gas turbine is therefore to be attributed purely to the compression which the gas flow experiences in the compression stage of the gas turbine. Corresponding to the compression rate which prevails there, the temperature level of the gas flow is increased to a greater or lesser extent. According to the embodiment, no fuel is therefore required for transferring thermal energy to the gas flow so that a particularly inexpensive method results.

According to an alternative embodiment of the method, it is provided that during the operation of the generator as a motor for releasing thermal energy by means of the gas flow fuel is fed to the gas turbine in a quantity which is less than a quantity which is fed to the gas turbine during normal power-generating operation, wherein the fuel is combusted in the gas turbine for generating thermal energy. If, for example, the compression rate in the compressor stage should not be sufficient in order to achieve a predetermined temperature level of the gas flow, fuel can be fed to this in the gas turbine and is then combusted by ignition. The combustion serves for the provision of thermal energy which is transferred to the gas flow.

The supplying of the gas flow with fuel differs, however, according to the embodiment from a normal operation of the gas turbine for power generation to the effect that the thermal energy is not provided for operation of the turbine stage in the gas turbine to the same extent as in the case of a conventional operation. The thermal energy serves on the one hand for increasing the thermal energy content of the gas flow to a level which does not normally enable the normal operation of the turbine stage. On the other hand, the additional firing of fuel, for example natural gas, in the combustion chamber also enables a release of thermal power in the turbine stage, as a result of which a mechanical drive of this is achieved which, however, is lower than in the case of a normal operation. In this respect, by means of a suitably adjusted feed of fuel and combustion thereof, the motor can be unloaded and even controlled with regard to power consumption. In this case, smaller quantities of fuel are required than in comparison to a conventional operation for power generation. According to the embodiment, the temperature or the thermal energy content of the gas flow can therefore be advantageously increased.

According to a development of the method, it can also be provided that the operation of the generator as a motor for releasing thermal energy by means of the gas flow follows the operation of the generator in a normal power generating operation of the generator with a time delay of less than one hour, preferably of less than half an hour. In this case, normal operation is be understood by full-load operation. In this respect, relatively short changes between full load during power generation and an operation for drawing current from the electricity supply networks, with simultaneous storage of generated thermal heat, can also be achieved. The specified bridging times serve typically for thermal equalization during ramping down of the gas turbine for power generation. Such bridging times are necessary so that there is especially no need to fear thermal damage to the gas power plant as a result of an excessively rapid load changed from, for example, full load to a power consuming operation.

According to another embodiment of the invention, in a further step the extraction of the heat exchanger fluid and/or of the thermal store fluid from the thermal store is carried out, wherein the extracted heat exchanger fluid and/or the thermal store fluid is fed to a steam application as process steam or for the preparation of process steam. Such a steam application can preferably be the supply of industrial processes with steam from a water-steam cycle, into which the process steam is introduced.

According to another embodiment of the invention, in a further step the extraction of the heat exchanger fluid and/or of the thermal store fluid from the thermal store is carried out, wherein the extracted heat exchanger fluid and/or the thermal store fluid is provided for thermal conditioning of feed water in a water-steam cycle for operation of a steam turbine. To this end, the feed water is thermally conditioned by means of heat transfer for preheating and/or also for evaporation. Further steps of the thermal conditioning, especially for superheating steam of the feed water, typically subsequently follow on from there. Feed water is to be understood in this case both in the sense of condensate water which results in a coupled gas and steam power plant process, and also in the conventional sense of feed water which, for example, is provided for supplying an external steam process in an external steam power plant, for example.

According to another embodiment, it can also be provided that in a further step the extraction of the heat exchanger fluid and/or of the thermal store fluid from the thermal store is carried out, wherein the extracted heat exchanger fluid and/or the thermal store fluid is provided for conditioning the intake air of the gas turbine during a normal power generating operation. Such conditioning is typically carried out by means of an intake-air conditioner which is arranged in the induction region of the compressor stage. By means of suitable heat transfer from the heat exchanger fluid and/or from the thermal store fluid the intake air is therefore heated, as a result of which an efficient operation of the gas turbine can be achieved especially in partial load.

According to another embodiment of the invention, it can be provided that in a further step the extraction of the heat exchanger fluid and/or of the thermal store fluid from the thermal store is carried out, wherein the extracted heat exchanger fluid and/or the thermal store fluid is introduced into a district heating network.

According to a first embodiment of the gas power plant, provision can be made for the inclusion of at least one post-heating stage which interacts with the gas flow downstream with regard to the gas turbine and upstream with regard to the first heat exchanger so that additional thermal energy can be supplied to the gas flow. According to the embodiment, the temperature level of the gas flow can therefore be raised by additional thermal energy being made available to the gas flow from the post-heating stage. Consequently, a higher temperature level, and therefore a larger heat quantity, is available in the first heat exchanger and can be transferred to the heat exchanger fluid. Therefore, all further applications, which need to be supplied with thermally conditioned heat exchanger fluid, can be operated with a higher energy content or a higher heat quantity. This can especially have an advantageous effect upon the efficiency of these applications.

According to a development of this embodiment, it can be provided that the post-heating stage provides thermal energy by means of a combustion process, which combustion process is especially a combustion process which is supplied with natural gas. The natural gas can especially preferably be extracted from the fuel reservoir which also serves for supplying the gas turbine with fuel. Natural gas, moreover, in comparison to crude oil, for example, is a relatively environmentally more friendly energy source which can be combusted with higher efficiency and smaller residues. Accordingly, the present embodiment proves to be particularly environmentally suitable. Moreover, with extraction from the same fuel reservoir, which is also provided for supplying the gas turbine, additional provision of a fuel is not necessary.

It can also be advantageous if the heat transfer in the first heat exchanger is of sufficient magnitude to thermally convert the heat exchanger fluid into steam or into a superheated and pressurized fluid, wherein the heat exchanger fluid can preferably be stored under pressure in the thermal store. The heat exchanger fluid is especially water and is stored in superheated form. This water can subsequently be fed to a steam process for use in a steam power plant. Alternatively, the thermal store fluid can also fulfill this task instead of the heat exchanger fluid.

According to another embodiment, the heat exchanger fluid is water. This can be contained in a steam circuit, for example. Such a steam circuit is especially suitable for electric power generation, for example by means of a steam turbine. Consequently, the thermal energy contained in the heat exchanger fluid can be available to an efficient power generation process which in particular can also feed power, which is generated with a time delay, to the public electricity network. The thermal store fluid is also suitable for this instead of the heat exchanger fluid.

According to a further embodiment of the invention, the heat exchanger fluid and/or the thermal store fluid can be fed to an intake-air conditioner which is designed for preheating the intake air which is inducted into the compressor stage by means of the gas turbine during normal power generating operation. By preheating the intake air, the combustion process can be of a more efficient design. Moreover, it has been shown that less combustion residues, especially less solid combustion residues, are produced during the combustion process. Consequently, on the one hand the efficiency of the combustion process increases and on the other hand the influence of the combustion process upon the combustion air with regard to residues is also improved.

According to another embodiment of the gas power plant according to the invention, the heat exchanger fluid and/or the thermal store fluid can be fed to a third heat exchanger which is designed for preheating feed water in the steam process for operating a steam turbine. Accordingly, the thermal energy content of the feed water can be increased in a suitable manner, as a result of which the subsequent power generation process can be carried out more efficiently by means of a steam turbine.

According to a further embodiment, the heat exchanger fluid and/or the thermal store fluid are, or is, in thermal and/or fluid communication with a district heating network.

Consequently, the heat which is provided by means of the gas turbine can be transmitted directly to the end user with low loss.

The invention shall subsequently be exemplarily described with reference to several figures. In this case, reference may be made to the fact that the figures are only to be schematically understood and do not represent any limitation with regard to a substantiation of the depicted embodiment. Moreover, the individual features which are shown in the figures are claimed in isolation as well as in conjunction with the other features which are shown in the figures.

DETAILED DESCRIPTION OF INVENTION

Figure 1:
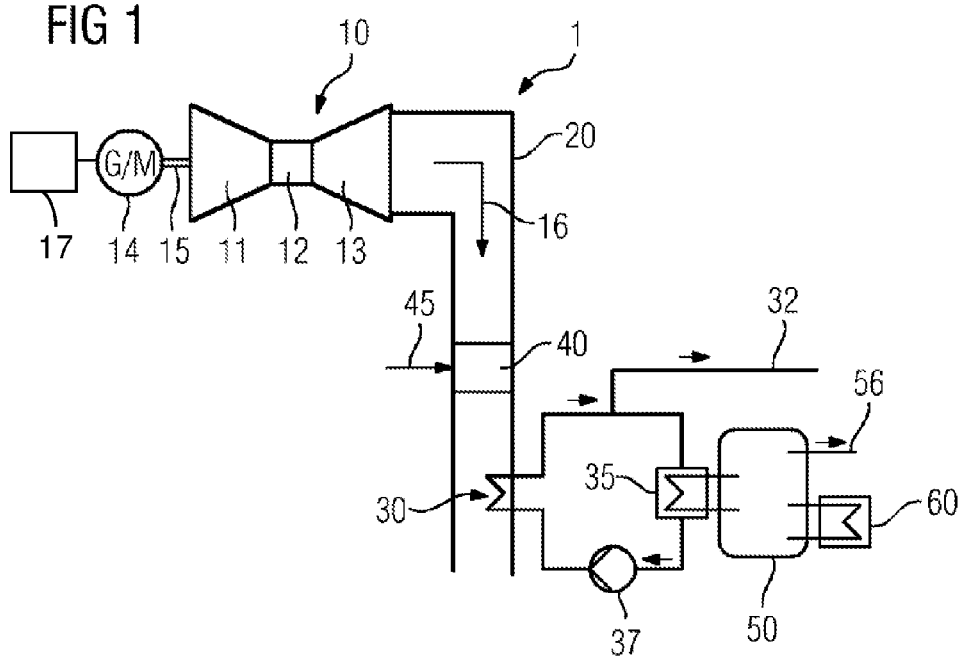
FIG. 1 shows a first embodiment of the gas power plant according to the invention in a schematic view.

FIG. 1 shows a first embodiment of the gas power plant 1 according to the invention in a schematic view. In this case, the gas power plant 1 comprises a gas turbine 10 which has a compressor stage 11, a combustion chamber stage 12 and a turbine stage 13. The gas turbine 10 is connected to a generator 14 via a shaft 15. The generator 14 is connected to a public electricity network 17 and is suitable according to the invention for also being driven as a motor that consumes electrical energy from the public electricity network 17. Accordingly, the gas turbine 10 can be operated in a normal power generating mode that delivers electrical energy to the public electricity network 17 as well as in a mode which consumes electrical energy from the public electricity network 17 as the generator 14 acts as the motor to drive the shaft 15 for providing thermal heat.

In the mode which is suitable purely for providing thermal heat while consuming electric energy, the generator 14 is operated as a motor, wherein intake air is inducted into the compressor stage 11, forming a gas flow 16 which passes through the combustion chamber stage 12 but without being mixed with a fuel in a quantity as would be added to the gas flow 16 during normal operation. In particular, no fuel is added to the gas flow 16. The gas flow 16, on account of the compression in the compressor stage 11, increases in heat content as a result of fluid-dynamic compression. The gas flow 16 furthermore enters the turbine stage 13 and passes through this. In the process, the gas flow 16 can release energy to the turbine but to a considerably lesser extent than as would be the case in a normal power generating mode. Typically, the gas flow scarcely changes its temperature level as a result of the energy loss to the turbine. After discharging from the turbine stage 13, the gas flow 16 flows into a gas routing device 20 and is directed in a suitable manner to a first heat exchanger 30 at which the thermal energy from the gas flow 16 is released to a heat exchanger fluid (not shown in the present case).

In order to increase the temperature level of the gas flow 16 when required provision can be made between the gas turbine 10 and the first heat exchanger 30 for a post-heating stage 40 which is suitable for providing additional thermal energy to the gas flow 16. According to an embodiment, the post-heating stage 40 can be supplied with natural gas as fuel by means of a natural gas feed line 45, wherein as a result of a combustion process the combustion heat can be released to the gas flow 16 by means of the post-heating stage 40. Consequently, it can be ensured that the first heat exchanger 30 is supplied with sufficient thermal energy.

According to the embodiment, the first heat exchanger 30 is in thermal functional communication with a circuit of the heat exchanger fluid.

Depending upon the temperature level of the gas flow 16, temperatures which induce a phase transfer of the heat exchanger fluid can be achieved. In particular, with sufficient heat feed to the heat exchanger fluid this can be converted into a vaporous or gaseous phase. By the same token, it can also be superheated under pressure, wherein the liquid phase is maintained. The heat exchanger fluid can be extracted according to the embodiment from the circuit as steam via a steam line 32 in order to be available to further steam-engineering applications.

It is also provided to transfer the thermal energy of the heat exchanger fluid from the heat cycle—which is fluid-dynamically driven by means of a pump 37—in a second heat exchanger 35 to a thermal store fluid (not shown in the present case) which, for example, can be temporarily stored in a thermal store 50. In this way, the thermal store fluid absorbs thermal energy in the second heat exchanger 35 so as to be stored in the thermal store 50 for later use. According to an alternative embodiment, the heat exchanger fluid can also be stored in the thermal store 50 for later use.

If required, the thermal store fluid can, for example, be extracted again from the thermal store 50 via an extraction line 56. Preferably, the thermal store fluid can, for example, be extracted for supplying a district heating line. Alternatively to a direct extraction of the thermal store fluid from the thermal store 50, extraction of thermal energy can also be achieved by means of a third heat exchanger 60. The heat exchanger 60 can be adapted in this case for pre-specified thermal applications. Such applications can, for example, be the preheating of feed water or the preheating of process fluid as well as the preheating of process gases.

Figure 2:
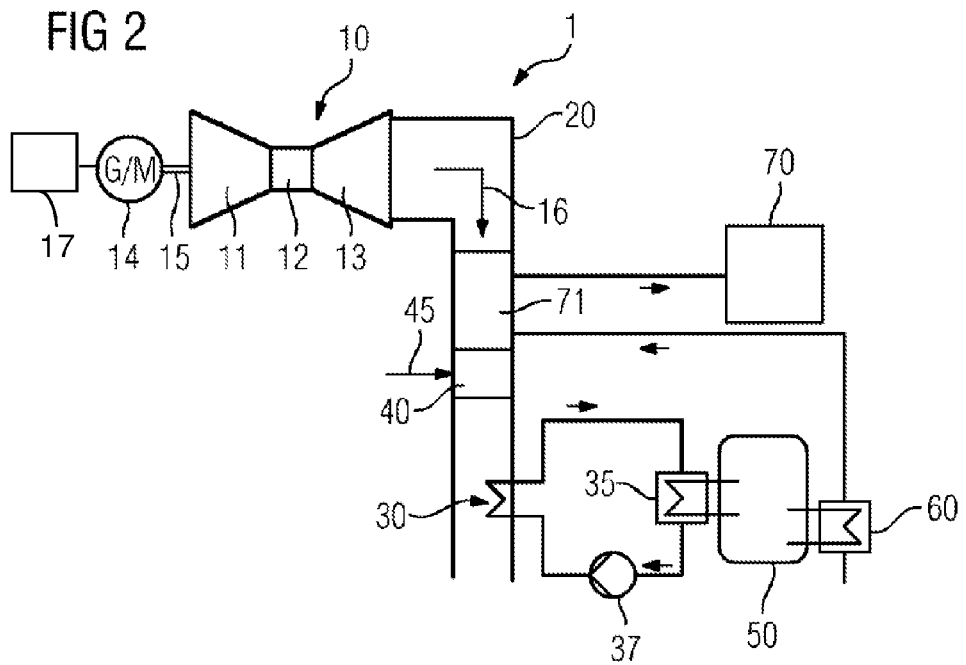
FIG. 2 shows a second embodiment of the gas power plant according to the invention in a schematic view.

FIG. 2 shows a further embodiment of the gas power plant 1 according to the invention, which differs from the embodiment shown in FIG. 1 only to the effect that the gas routing device 20 has a steam generator unit 71. The steam generator unit 71 is preferably provided in the gas routing device 20 between the post-heating stage 40 and the gas turbine 10. The steam generator unit 71 is used for steam generation during the normal power generating operation of the gas turbine 10, wherein the steam generated in this way can be fed to a steam turbine 70 for driving it. An improvement according to the embodiment is achieved by providing thermal energy via the third heat exchanger 60 which extracts from the thermal store 50 the energy of the thermal store fluid which is stored therein. As a result, heat, or preheated fluid (water, for example), can be fed to the steam generator unit 71, which is why a lower heat transfer is consequently required in the steam generator unit 71—in order to be raised to a predetermined temperature level—than in the case of a gas power plant which does not provide the preheating according to the embodiment. The steam generator unit 71 in this case can have further preheating stages or even just one steam generator or superheater.

The preheating of the fluid (water, for example) which is fed to the steam generator unit 71 proves to be particularly advantageous when the gas turbine 10 is changed over from an idling state to an operating stage. If the fluid which is provided in the steam generator unit 71 is specifically already at a higher temperature level at the point in time of start-up of the gas turbine, the point of steam generation is initiated at a relatively earlier point in time. Accordingly, the steam turbine 70 can also be used for power generation at a relatively earlier point in time. Consequently, the start-up times for operation of the steam turbine 70 can therefore be reduced.

According to an alternative embodiment, but which is not shown in FIG. 2, the transfer of thermal energy to the fluid which is fed to the steam generator unit 71 can also be carried out by means of the second heat exchanger 35.

Figure 3:
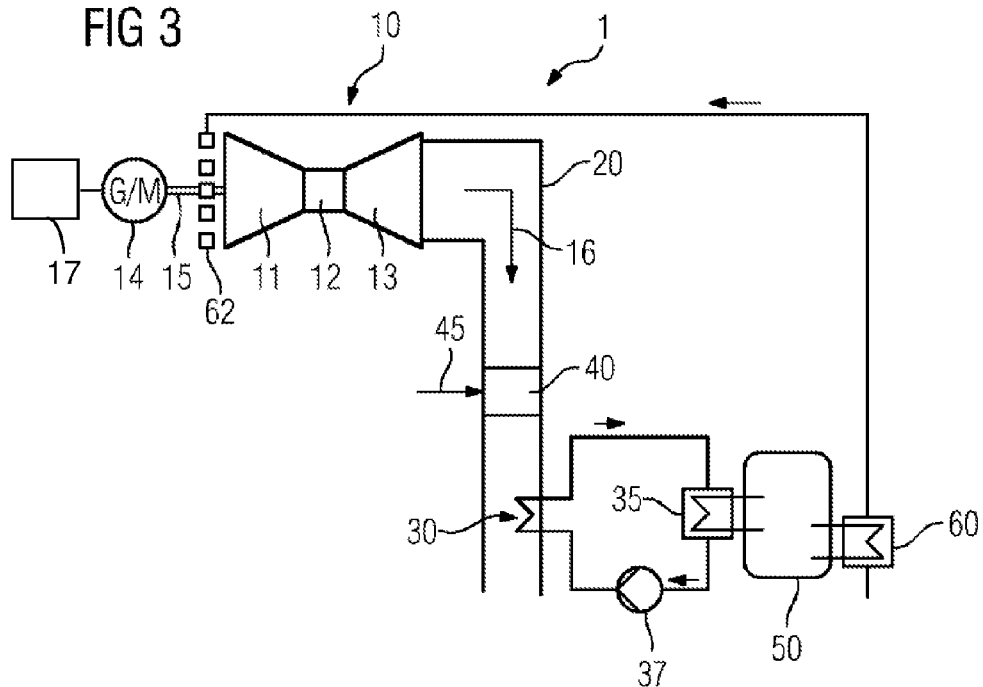
FIG. 3 shows a third embodiment of the gas power plant according to the invention also in a schematic view.

FIG. 3 shows a further embodiment of the gas power plant 1 according to the invention which differs from the embodiment shown in FIG. 1 only to the effect that thermal energy can be extracted from the thermal store 50 by means of the third heat exchanger 60, wherein this energy is fed to an intake-air conditioner 62 which is designed for preheating the intake air which is inducted into the compressor stage 11 during a normal power generating operation of the gas turbine 10.

Figure 4:
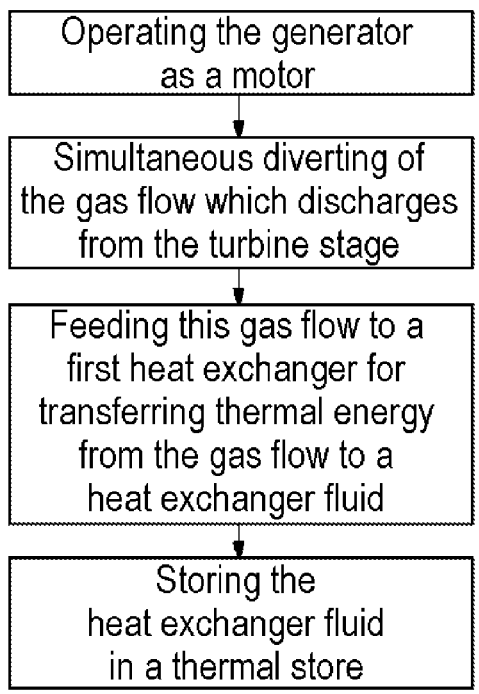
FIG. 4 shows a flow diagram for describing an embodiment of the method according to the invention.

FIG. 4 shows a flow diagram for describing an embodiment of the method according to the invention. In this case, in a first step the generator 10 is operated as a motor in order to form a gas flow 16 which has an increased temperature level in comparison to the ambient temperature. At the same time, in a second step the gas flow 16, which discharges from the turbine stage 13 and has an increased thermal energy level, is diverted, i.e. is guided in a desired direction. The gas flow 16 is then fed to a first heat exchanger 30 for transferring at least some of the thermal energy to a heat exchanger fluid. This can then be temporarily stored according to the embodiment in a thermal store 50 for later consumption. Alternatively, the thermal energy can also be transferred in a second heat exchanger 35 to a thermal store fluid, not additionally shown, which can also be provided for temporary storage in a thermal store 50.

Further embodiments of the invention can be gathered from the dependent claims.

The invention claimed is:

1. A method for operating a gas power plant, comprising a gas turbine, which has a compressor stage and a turbine stage, and is connected to a generator via a shaft, wherein the generator is connected to an electricity network and designed to also be operated as a motor, which method comprises the following steps:
   operating the generator as a motor to consume electrical power from the electricity network for the rotational operation of the shaft;
   feeding fuel to the gas turbine during operation of the generator as a motor in a quantity which is lower than a quantity which is fed to the gas turbine when electrical power is supplied to the electricity network;
   simultaneously diverting of the gas flow which discharges from the turbine stage during operation of the generator as a motor;
   feeding this gas flow to a first heat exchanger for transferring thermal energy from the gas flow to a heat exchanger fluid; and
   feeding the heat exchanger fluid to a thermal store.

2. The method as claimed in claim 1, wherein the generator is operated as a motor by means of surplus power from the electricity network.

3. The method as claimed in claim 1, wherein the generator is operated as a motor at variable rotational speed.

4. The method as claimed in claim 1, wherein the generator is operated as a motor in such a way that the gas flow has at least a temperature of 100° C.

5. The method as claimed in claim 4, wherein the generator is operated as a motor in such a way that the gas flow has at least a temperature of 150° C.

6. The method as claimed in claim 4, wherein the generator is operated as a motor in such a way that the gas flow has at least a temperature of 300° C.

7. The method as claimed in claim 1, wherein the operation of the generator as a motor for releasing thermal energy by means of the gas flow follows the operation of the generator in a normal power generating operation when the electrical power is supplied to the electricity network with a time delay of less than one hour.

8. The method as claimed in claim 7, wherein the operation of the generator as a motor for releasing thermal energy by means of the gas flow follows the operation of the generator in a normal power generating operation with a time delay of less than half an hour.

9. The method as claimed in claim 1, further comprising extraction of the heat exchanger fluid and/or of the thermal store fluid from the thermal store, wherein the extracted heat exchanger fluid and/or the thermal store fluid is fed to a steam application as process steam or for the preparation of process steam.

10. The method as claimed in claim 1, further comprising extraction of the heat exchanger fluid and/or of the thermal store fluid from the thermal store, wherein the extracted heat exchanger fluid and/or the thermal store fluid is provided for thermal conditioning of feed water in a water-steam cycle for operating a steam turbine.

11. The method as claimed in claim 1, further comprising extraction of the heat exchanger fluid and/or of the thermal store fluid from the thermal store, wherein the extracted heat exchanger fluid and/or the thermal store fluid is provided for thermal conditioning of intake air of the gas turbine during a normal power generating operation.

12. The method as claimed in claim 1, further comprising extraction of the heat exchanger fluid and/or of the thermal store fluid from the thermal store, wherein the extracted heat exchanger fluid and/or the thermal store fluid is introduced into a district heating network.

13. A method for operating a gas power plant, comprising a gas turbine, which has a compressor stage and a turbine stage, and is connected to a generator via a shaft, wherein the generator is connected to an electricity network and designed to also be operated as a motor, which method comprises the following steps:
  operating the generator as a motor to consume electrical power from the electricity network for the rotational operation of the shaft;
  simultaneously diverting of the gas flow which discharges from the turbine stage during operation of the generator as a motor;
  feeding this gas flow to a first heat exchanger for transferring thermal energy from the gas flow to a heat exchanger fluid; and
  transferring thermal energy of the heat exchanger fluid to a thermal store fluid, which thermal store fluid is fed to a thermal store in a further step;
  wherein no fuel is fed to the gas turbine during operation of the generator as a motor as the electrical power is consumed from the electricity network.

14. A gas power plant, comprising
  a gas turbine which has a compressor stage and a turbine stage, and is connected to a generator via a shaft, wherein the generator is connected to an electricity network and designed to be also operated as a motor to consume electrical power from the electricity network for the rotational operation of the shaft while fuel is fed to the gas turbine in a quantity which is lower than a quantity which is fed to the gas turbine when electrical power is supplied to the electricity network, and
  a gas routing device which interacts with the turbine stage in such a way that a gas flow, which discharges from the turbine stage, is diverted and fed to a first heat exchanger during operation of the generator as a motor, wherein the heat exchanger is designed to extract thermal energy from the gas flow and to transfer it to a heat exchanger fluid which can be introduced in a thermal store for temporary storage.

15. The gas power plant as claimed in claim 14, further comprising at least one post-heating stage which interacts with the gas flow downstream with regard to the gas turbine and upstream with regard to the first heat exchanger so that additional thermal energy can be supplied to the gas flow.

16. The gas power plant as claimed in claim 15, wherein the post-heating stage provides thermal energy by means of a combustion process.

17. The gas power plant as claimed in claim 16, wherein the post-heating stage provides thermal energy by means of a combustion process which is supplied with natural gas.

18. The gas power plant as claimed in claim 14, wherein the heat exchanger fluid is water.

19. A gas power plant, comprising
  a gas turbine which has a compressor stage and a turbine stage, and is connected to a generator via a shaft, wherein the generator is connected to an electricity network and designed to be also operated as a motor to consume electrical power from the electricity network for the rotational operation of the shaft while no fuel is fed to the gas turbine as the electrical power is consumed from the electricity network, and
  a gas routing device which interacts with the turbine stage in such a way that a gas flow, which discharges from the turbine stage, is diverted and fed to a first heat exchanger during operation of the generator as a motor, wherein the heat exchanger is designed to extract thermal energy from the gas flow and to transfer it to a heat exchanger fluid which in a second heat exchanger can release at least some of the thermal energy to a thermal store fluid which can be introduced in a thermal store for temporary storage.

* * * * *